US012800318B2

(12) United States Patent
Tribble et al.

(10) Patent No.: US 12,800,318 B2
(45) Date of Patent: Nov. 17, 2026

(54) ROUTE BASED FEATURE IMPLEMENTATIONS WITHOUT DEFINED ROUTE OR DESTINATION

(71) Applicant: SRAM, LLC, Chicago, IL (US)

(72) Inventors: William Tribble, New York, NY (US); Jessica Braun, Austin, TX (US); Stephen Winchell, New York, NY (US); Hunter Bryant, Los Angeles, CA (US); David Nesbitt, Port Deposit, MD (US); Brent Dimmig, Lancaster, PA (US)

(73) Assignee: SRAM, LLC, Chicago, IL (US)

( * ) Notice: Subject to any disclaimer, the term of this patent is extended or adjusted under 35 U.S.C. 154(b) by 342 days.

(21) Appl. No.: 18/099,536

(22) Filed: Jan. 20, 2023

(65) Prior Publication Data

US 2023/0251096 A1 Aug. 10, 2023

Related U.S. Application Data

(60) Provisional application No. 63/308,326, filed on Feb. 9, 2022.

(51) Int. Cl.
*G01C 21/30* (2006.01)
*G01C 21/36* (2006.01)

(52) U.S. Cl.
CPC ......... *G01C 21/30* (2013.01); *G01C 21/3697* (2013.01)

(58) Field of Classification Search
CPC ... G01C 21/30; G01C 21/3697; G01C 21/005
See application file for complete search history.

(56) References Cited

U.S. PATENT DOCUMENTS

| | | | | |
|---|---|---|---|---|
| 6,032,098 | A | 2/2000 | Takahashi | |
| 10,024,673 | B1 | 7/2018 | Zhang | |
| 2010/0198453 | A1 | 8/2010 | Dorogusker | |
| 2011/0172904 | A1* | 7/2011 | Dayaratne .......... | G01C 21/3484 701/533 |
| 2012/0277962 | A1* | 11/2012 | Ingram .................. | B62M 25/04 701/51 |

(Continued)

FOREIGN PATENT DOCUMENTS

| | | |
|---|---|---|
| CN | 109870164 | 6/2019 |
| JP | 5142047 | 2/2013 |
| TW | 2000923329 | 6/2009 |

*Primary Examiner* — Navid Z. Mehdizadeh
(74) *Attorney, Agent, or Firm* — Cowan, Liebowitz & Latman, P.C.; Daniel J. Gross

(57) ABSTRACT

A computer-based method is provided for providing analytical features at a navigation device. The method includes determining, by a position determining module of the navigation device, a first location of the navigation device associated with a first time. The method then proceeds to determine a second location of the navigation device associated with a second time and associates the first and second locations with coordinates on a first graph edge of a map, determines a travel direction based on a sequence of the locations, and determines a current location of the navigation device. An inferred path defining a travel path is then based on coordinates associated with the first and second locations, the travel direction, and the current location, and mapping data associated with the likely travel path is analyzed to identify a characteristic of interest of the likely travel path.

20 Claims, 9 Drawing Sheets

(56) References Cited

U.S. PATENT DOCUMENTS

| | | | | |
|---|---|---|---|---|
| 2015/0160027 | A1* | 6/2015 | Kitchel | G01S 19/19<br>701/533 |
| 2017/0074988 | A1* | 3/2017 | Kitchel | G01C 21/3844 |
| 2018/0245934 | A1* | 8/2018 | Zhang | G06Q 50/40 |
| 2019/0120640 | A1* | 4/2019 | Ho | G01C 21/3453 |
| 2022/0034662 | A1* | 2/2022 | Koponen | G01C 21/3844 |

* cited by examiner

ROUTE BASED FEATURE IMPLEMENTATIONS WITHOUT DEFINED ROUTE OR DESTINATION

CROSS-REFERENCE TO RELATED APPLICATION

This application claims the benefit of U.S. Provisional Application No. 63/308,326, filed on Feb. 9, 2022, the contents of which are incorporated by reference herein.

FIELD OF THE INVENTION

The invention relates to implementing features based on routing information, such as evaluation of path difficulty or evaluation of characteristics of a path, in the absence of a defined route. In particular, the invention relates to implementing analytical features that traditionally rely on defined routes for data in the context of GPS systems where no route or destination is defined.

BACKGROUND

Many features incorporated into navigation software, such as in the context of GPS systems, provide value to users by giving them information about upcoming characteristics of a route on which they are traveling. In the context of a bicycle GPS system, such features may include, for example, an indication of or information about upcoming characteristics of their route, such as upcoming climbs. Such features may similarly alert users to some risk, such as a sharp curve or an unpaved road, or a potential obstruction, such as traffic or a road of a type that is otherwise not recommended.

Such features are generally based on routing information, and apply when a user defines either a route or a destination, allowing the GPS system to generate a route. Generally, such features cannot be provided absent a defined route being followed. That is because such features generally function by analyzing details of a route as applied to mapping data.

However, many such features may provide value to users even where the user is not following a specified route or approaching a defined destination. This may be in order to provide a user with information generally or to provide a user with motivation. Further, such information may be valuable even if not fully accurate, as a user may wish to see, for example, climbs they are likely to approach during a ride and determine whether they would prefer to avoid such climbs. Similarly, seeing upcoming climbs may motivate a user should they choose to attempt such climbs.

Further, the ability to provide features to users absent a specified route may be valuable for exposing users to such features. In the context of bicycle GPS systems, many rides are taken without programming routes or destinations into the systems, and as such, users often can't access route-based features. However, because GPS systems are incorporated into cycling computers, such users are still accessing their GPS systems and relying on them for other information about their ride. Similarly, if features provide safety benefits, such as alerting users to upcoming hazards, there is value in presenting warnings regardless of whether a user has programmed a route or destination.

Further, there is value to both the user and system operators when users program routes and/or destinations into GPS systems. By exposing users to route based features, with the users recognizing that the performance of such features can be improved by programming routes or destinations, users may be encouraged to program such routes or destinations. Accordingly, there is value in exposing such users to available features.

Some existing GPS systems may present known route segments, such as previously recorded routes, in a map, and such route segments may be selectable, or may become active when a rider begins such a segment. Once such a route segment is selected or initiated, features may be presented based on that segment. However, such features are generally presented based on proximity to such a route segment, and features are presented only for the segment itself. Further, in most such systems, features are presented only once a user selects a route segment presented or confirms that they are indeed proceeding on such a segment.

There is a need for a system and method that can present users with path-based features without requiring that users define a route or destination.

SUMMARY

In some embodiments, a computer-based method is provided for providing analytical features at a navigation device. The method includes determining, by a position determining module of the navigation device, a first location of the navigation device associated with a first time.

The method then proceeds to determine, by the position determining module, a second location of the navigation device associated with a second time. The method then associates the first and second locations with coordinates on a first graph edge of a map.

The method then determines a travel direction based on a sequence of the first and second locations and determines, using the position determining module, a current location of the navigation device.

The method then identifies a first inferred path based on the coordinates associated with the first and second locations, the travel direction, and the current location. The first inferred path defines a likely travel path.

The method then analyzes mapping data associated with the likely travel path to identify at least one instance of a characteristic of interest of the likely travel path, and presents the identified instance of the characteristic of interest to a user.

In some embodiments, the method further includes presenting a graphical representation of the likely travel path to the user, where the presenting of the identified instance of the characteristic of interest is at least partially integrated into the representation of the likely travel path.

In some embodiments, the method includes defining the determined current location as a third location of the navigation device associated with a third time and associating the third location with coordinates on the first graph edge of the map. The method then determines a travel direction based on a sequence of the first, second, and third locations and determines, using the position determining module, an updated current location of the navigation device.

The method then proceeds to identify a second inferred path based on the first, second, and third locations, the travel direction, and the current location, and redefines the likely travel path if the second inferred path defines a likely travel path different than the first inferred path.

In some such embodiments, the second inferred path is identified only upon determining that the updated current location of the navigation device is not on the likely travel path.

In some embodiments, the first inferred path is further based on transition costing logic defining costs of transitioning from the first graph edge to a second graph edge with a high maneuver penalty.

In some such embodiments, the first inferred path is assumed to proceed substantially straight on consecutive graph edges unless an obstruction increases a cost associated with proceeding substantially straight. In some such embodiments, each transition between graph edges is assigned a cost, and a cost of the transition to the second graph edge is partially based on a road classification of the second graph edge.

In some embodiments utilizing transition costing logic, the first inferred path is identified iteratively such that a first portion of the likely travel path is first defined and a continuation of the first inferred path is further based on the inclusion of locations along a graph edge included along the likely travel path.

In some such embodiments, the iterative method includes locations along the graph edge in the first inferred path only upon confirming that the inferred path has not looped back on itself, and upon confirming that either a street name for a location to be included is related to a street name of a previous graph edge or the location to be included does not require a turn.

In some embodiments utilizing transition costing logic, any potential transition from the first graph edge to a potential second graph edge is assigned a cost and a selection of the second graph edge for inclusion in the inferred path is based partially on whether the second graph edge has a street name related to a street name of the first graph edge.

In some embodiments, the first inferred path is not based on a defined or predicted destination.

In some embodiments the at least one characteristic of interest is elevation data associated with the likely travel path. In some such embodiments, the method then includes identifying, in the elevation data, at least one ascent along the likely travel path for presentation to the user, determining at least one metric associated with the at least one ascent, and presenting the at least one identified ascent to the user with the at least one metric.

In some such embodiments, the at least one metric is one of length of climb, grade of climb, and elevation of climb.

In some embodiments leveraging elevation data to identify ascents, the at least one ascent is a plurality of ascents.

In some embodiments leveraging elevation data to identify ascents, the at least one ascent is presented to the user only if the at least one metric associated with the at least one ascent is greater than a threshold associated with the corresponding metric.

In some embodiments, the method includes identifying, based on the coordinates associated with the first and second locations, the travel direction, and the current location, at least one secondary potential travel path. The method then analyzes mapping data associated with the at least one secondary potential travel path to identify at least one instance of the characteristic of interest associated with the at least one secondary potential travel path. The method then presents the at least one secondary potential travel path and the at least one instance associated with the at least one secondary potential travel path to the user with the at least one instance associated with the likely travel path.

In some such embodiments, the method initially identifies the likely travel path and the at least one secondary potential travel path prior to analyzing mapping data associated with each of the likely travel path and the secondary potential travel path. The method then analyzes mapping data associated with each of the likely travel path and the at least one secondary potential travel path to identify at least one instance associated with each travel path, and ranks the likely travel path and the at least one secondary potential travel path based on a metric associated with the characteristic of interest. The at least one secondary potential travel path may then be redefined as the likely travel path and the first inferred path is redefined as a secondary potential travel path based on the metric.

In some embodiments in which a secondary potential travel path is identified, the likely travel path and the at least one secondary potential travel path are presented to the user on a single map, and wherein an indication of each travel path has a characteristic associated with the characteristic of interest. In some such embodiments the characteristic of the indication of each travel path is a color of a route marker.

In some embodiments, the method further includes retrieving prior travel data from a database, the prior travel data comprising routes previously traveled by the user, and the identification of the first inferred path is further based on the prior travel data. In some such embodiments, the prior travel data includes a personal heatmap representing routes previously traveled by the user or a generalized heatmap representing routes previously traveled by a group of users including the user.

In some embodiments, the method further includes retrieving user preference information, and the identification of the first inferred path is further based on the user preference information. In some such embodiments, the user preference information includes a graph edge surface or type preference.

Also provided herein is a device comprising any feature described herein, either individually or in combination with any other feature and in any configuration. Also provided herein is a method comprising any act described in this specification, either individually or in combination.

DETAILED DESCRIPTION OF THE PREFERRED EMBODIMENTS

Figure 1:
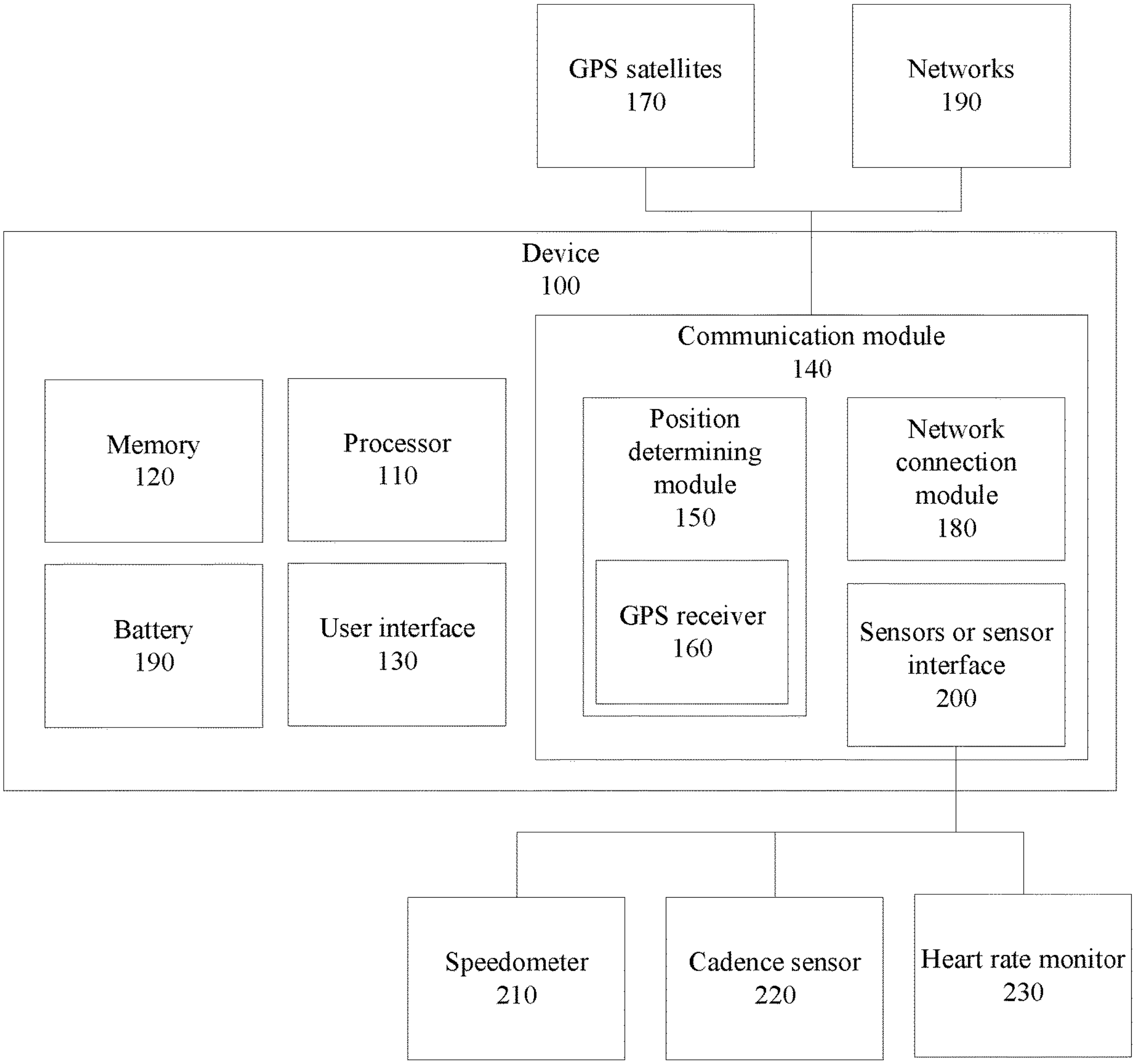
FIG. 1 shows a schematic representation of a navigation device for implementing the methods described herein.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

This disclosure generally relates to navigation software features that traditionally rely on routing information in order to present valuable information to users of such navigation systems. While such navigation software features may provide value in a wide variety of contexts, the embodiment presented herein and the features described in detail are in the context of bicycle navigation systems incorporated into cycling computers. Further, while various navigation software systems may benefit from the features described herein, the features are presented in the context of cycling computers relying on Global Positioning System (GPS) based navigation. It will be understood that alternative embodiments, such as more general navigation systems, including those designed for driving or walking, are contemplated as well. Similarly, it will be understood that GPS systems are described herein because such systems are well known and are the systems most commonly found, but implementations in alternative or future navigational systems are contemplated as well.

Many mobile electronic devices incorporate navigation functionality. Such functionality may be provided by way of GPS receivers which may be used to support various features incorporated into a user interface of the mobile electronic device. For example, a cycling computer provide routing information to a user.

Such routing information may be in order to direct a user to a defined destination, or it may be in order to follow a pre-programmed route. Where a user seeks directions to a defined destination, they may program the destination, and the cycling computer may then automatically determine and select a route based on some internal criteria, such as a determination of the shortest or fastest route to the destination. Accordingly, once a user programs a destination, no further user intervention is required, and the cycling computer may provide turn by turn directions to the destination.

Where a user selects a complete defined route, such as a stored route drawn from a database, the cycling computer may provide turn by turn directions in order to maintain the user on the defined route.

Where a user strays from a route based on a programmed destination, the cycling computer will recalculate a route to direct the user towards the destination based on the internal criteria. In contrast, when a user strays from a defined route, the cycling computer will typically direct the user to return to the route.

Once a route is defined, many features may be provided that rely on routing information within that route definition, referred to herein as route-based features. Such features may include informational features, such as a presentation of upcoming climbs, such as hills along the route. Such route-based features may further include alerts indicating risks or potential inconvenience, such as upcoming sharp curves or road type changes. Accordingly, while the methods discussed herein present climb information, such methods can similarly present road conditions, elevations, etc.

By inferring a travel path from current user location or activity, user history, and/or user preferences, the system and method described herein may define a likely travel path. Such a likely travel path may then be used in place of a route in order to provide route-based features.

Methods described herein may be implemented in a mobile electronic device, such as the navigation device schematically shown in FIG. 1. The outcome of the methods may be presented to users by way of a user interface 130 using a display scheme such as that shown in FIGS. 4-14. It is understood that such methods may be similarly implemented in other mobile electronic devices including navigation functionality, and with alternate interfaces. Further, while several route-based features are described herein, a wide variety of such route-based features are contemplated.

FIG. 1 shows a schematic representation of a navigation device 100 for implementing the methods described herein. In the embodiments discussed, the device 100 is generally a cycling computer and is operable to provide navigation functionality to a cyclist. However, the device 100 may similarly be a GPS device designed for other activities, such as cycling or driving, or it may be a general-purpose smartphone having navigation applications.

The device 100 is provided with a processor 110 and a memory 120. The processor 110 includes processing circuitry and provides processing functionality for the device 100, and may include any number of processors, microcontrollers, or other processing systems. The processor 110 may be formed from a variety of materials and components, and may execute the methods described herein.

The memory 120 may provide storage functionality, and may store various instructions and data associated with the operation of the device 110. Such instructions and data may include software programs for implementing the methods described herein, as well as data for supporting such software programs.

The memory 120 may be integral with or independent of the processor 110, and may take a wide variety of forms. For example, the memory may be non-removable memory elements, such as RAM, as well as ROM, Flash (such as removable memory cards), magnetic media, optical media, USB devices, and others. Data for use in the methods described herein may be provided on the memory 110 or may be provided independently in a database. Such data may include the instructions for operating an application implementing the methods described herein, as well as data for supporting such methods, such as mapping data and metadata, routing algorithms, records of previously executed rides, etc.

The device 100 is further provided with a user interface 130 through which a user interacts with the device. Such a user interface 130 may be, for example, a touch screen through which the user may enter commands and receive feedback. Such a touch screen may display maps and present the output of the route-based features discussed herein. The user interface 130 may include buttons instead of or in addition to touch-based features in the display, and the user interface may similarly include a display independent of any user control. For example, in the case of a cycling computer, a user may control the device by way of speech recognition software, or a user may control the device by buttons mounted on handlebars instead of at the device 100 itself. Similarly, the user interface 130 may be configured to incorporate gesture-based controls. The display may be any of a wide variety of standard displays, including LCD, LED, and any other type of display. The display is typically configured to present text and/or graphical information to the user.

Typically, applications implementing the methods described herein are stored in memory 120 and are executed by the processor 110. Such applications implement software user interfaces and users interact with the applications by way of the device 100 user interface 130.

The device 100 also provides a communication module 140 for providing access to devices and data sources independent of the device itself. The communication module 140 includes a position determining module 150, which typically takes the form of a GPS receiver 160, as discussed above. The position determining module may then receive signal data transmitted by one or more external data sources, typically GPS satellites 170. While GPS satellites 170 are illustrated, position data for geolocating the device 100 may take a wide variety of forms, such as positioning beacons for triangulating the device. In any event, the position determining module 150 is operable to determine a geographic position through processing of data received from an external data source, such as GPS satellites 170.

Typically, the position determining module 150 provides data to the processor 110 which may then be used to implement a wide variety of basic features, including the illustration of a location on a map drawn from the memory 120. Similarly, the data may be used to determine a velocity and/or direction of movement for a user of the device.

The communication module 140 may further include a network communication module 180 for interfacing with an external network 190 as well as to send or receive information to a second iteration of the device 100 or a different device, such as a smartphone. The network communication module 180 may include a transceiver as well as components for operating the transceiver, such as one or more antennas, a wireless radio, data ports, and any required software interface for implementing communication protocols utilized by the network communication module 180. The external network may be a localized network and may be accessed by way of Wi-Fi or Bluetooth protocols, or it may be the internet accessed by way of a cellular provider, for example. In some embodiments, the device 100 networks with a user's smartphone by way of a Wi-Fi or Bluetooth connection and accesses the internet by way of the user's smartphone.

A battery 190 is provided in order to provide power to the other components of the device 100. Such a battery 190 may be built in to the device 100 and rechargeable or it may be removable for charging outside of the device or for replacement.

The device 100 may provide at least one sensor or sensor interface 200 for interfacing with external sensors. Such sensor interfaces 200 may allow the device to receive data from peripheral sensors, such as a speedometer 210, cadence sensor 220, heart rate monitor 230, and others. Such sensor interfaces 200 may be wired or wireless. It will be understood that sensors may be integrated into the device 100 as well, such as inertial sensors including accelerometers, directional sensors, such as a compass, and general orientation sensor. Such sensors, both internal to the device 100 and connected by way of the sensor interfaces 200, may support independent features of the device 100 as well as provide additional data by which the device 100 can infer a likely path, as discussed in more detail below.

Figure 2:
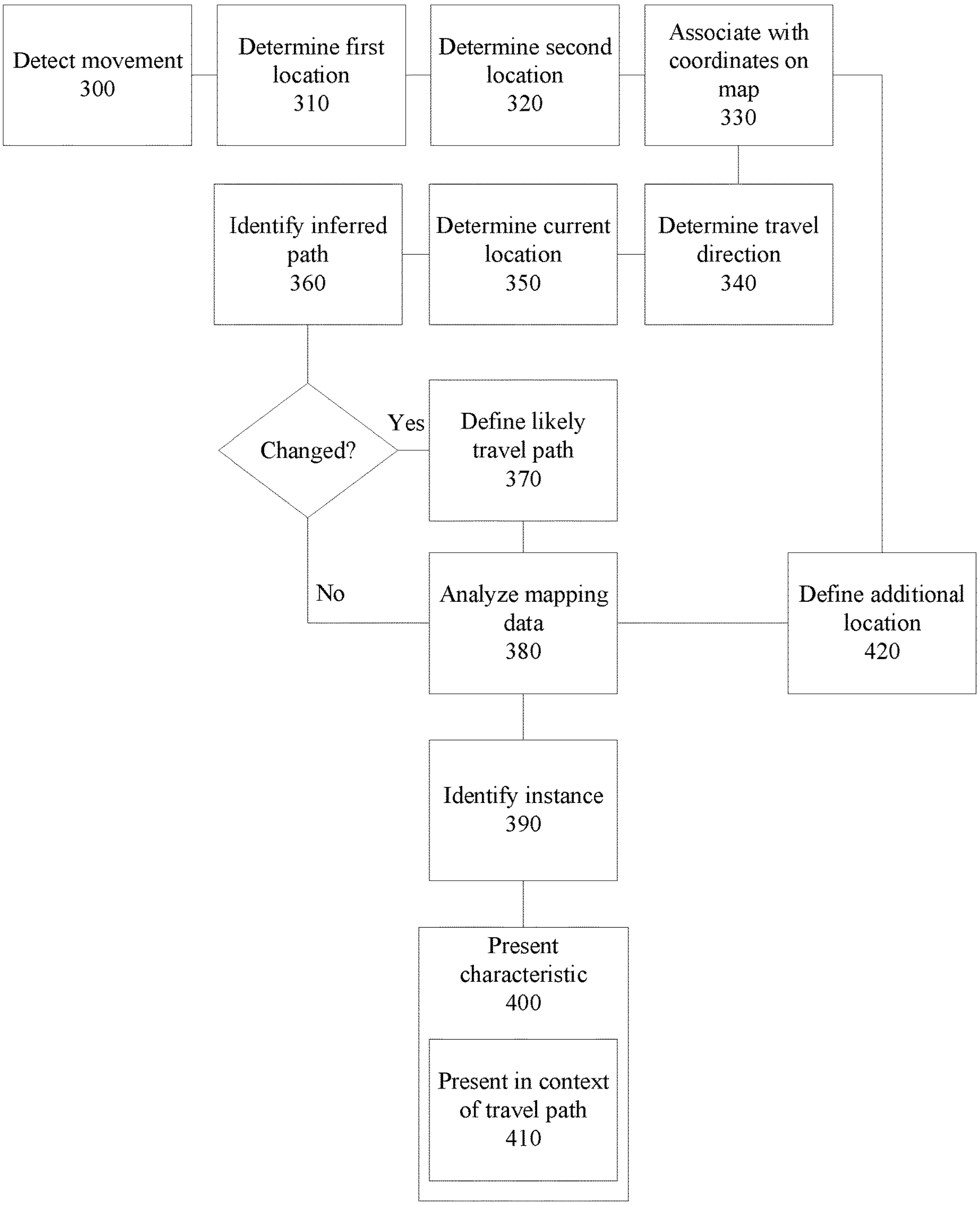
FIG. 2 illustrates a method for providing analytical features at the navigation device of FIG. 1.

FIG. 2 illustrates a method for providing analytical features analogous to route-based features at the navigation device 100 of FIG. 1.

In using the analytical features described herein, a user would not program a route, nor would they define a destination. Similarly, in most embodiments, the device would not predict or otherwise infer a destination. As such, the device 100 would infer a path to be used for analysis. In order to initiate such features, a user would begin traveling with the device 100, and the device would then detect movement (300), either by way of the position determining module 150 or by way of a sensor, either internal to the device or connected at the interface 200. For example, a speedometer 210 or a cadence sensor 220 may detect the beginning of a ride.

Once movement is detected (at 300), the method proceeds by determining a location of the navigation device 100 at various intervals. The method may then determine (310), by way of the position determining module 150, a first location of the navigation device 100 associated with a first time. The method may then proceed to determine (320), by way of the position determining module 150, a second location of the navigation device 100 associated with a second time.

The method then associates (330) the first and second locations (determined at 310, 320) with coordinates on a first graph edge of a map. In the context of a map used for navigation in a cycling computer, a graph edge, as referenced herein, is a travelable segment of a map. A graph edge may be a road or a bike path, for example. Accordingly, when the method associates (at 330) the locations with coordinates on the first graph edge, the method locates the two identified locations along a travelable segment of the map.

As a user travels with the device 100, the user would typically travel along graph edges and transition between adjacent graph edges. It is understood that while graph edges are discussed, the method applies equally well to other definitions of travelable segments within mapping data. Similarly, as noted below, graph edges may be defined more or less granularly, but this would have no impact on the implementation of the method. In the context of this disclosure, graph edges are uninterrupted travelable segments of a map having consistent characteristics and terminating at nodes. Nodes at which graph edges terminate may correspond to an intersection or branch, or they may correspond to some change in a characteristic of a corresponding road, such as speed limit, surface texture, or road name, among others.

It is further noted that while the method is described as associating the locations with coordinates on the first graph edge, in some embodiments, consecutive locations may be on different graph edges located relative to each other. For example, the locations may be on consecutive or adjacent graph edges or disconnected graph edges. Such scenarios may become more common as more locations are added to the actual or inferred path travelled, as discussed below. In such scenarios, a map-matching technique may be used to associate prior locations a rider has passed through to graph edges. Where graph edges for prior locations are disconnected, the map-matching algorithm may then determine the best or most likely path to connect the edges.

The method then proceeds to determine a travel direction (340) for the device 100 based on a sequence of the first and second locations and determines (350), by the position determining module 150, a current location of the navigation device 100. Accordingly, the method will have located the device on a travelable path on a map and determined a direction of travel.

The method then proceeds to identify (360) a first inferred path based on the coordinates associated with the first and second locations (determined at 330), the travel direction (determined at 340), and the current location (determined at 350). The inferred path is further identified based on characteristics of the map itself and graph edges adjacent to the first graph edge at which the device 100 has been located. Such a process for inferring a path is discussed in more detail below with respect to FIG. 3.

The method then defines (370) a likely travel path as corresponding to the first inferred path. Once a likely travel path is defined (at 370) on the map, the likely travel path can be used for analytics. Accordingly, the method analyzes mapping data associated with the likely travel path (380) in order to identify (390) at least one instance of a characteristic of interest of the likely travel path. Such a characteristic of interest may be, for example, an upcoming climb or a hazard. Once identified, an instance of the characteristic of interest is presented (400) to the user.

In some embodiments, a graphical representation of the likely travel path is presented (410) to the user. In such embodiments, the presenting of the characteristic of interest (at 400) is at least partially integrated into the representation of the likely travel path.

Figure 4:
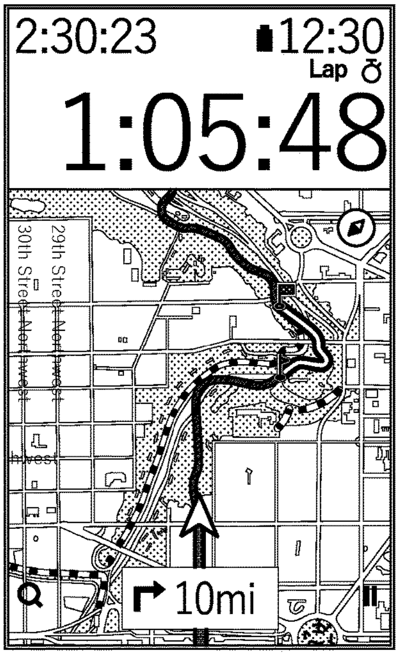
FIGS. 4-14 illustrate example display configurations of a device implementing the method of FIG. 2.
Figure 5A:
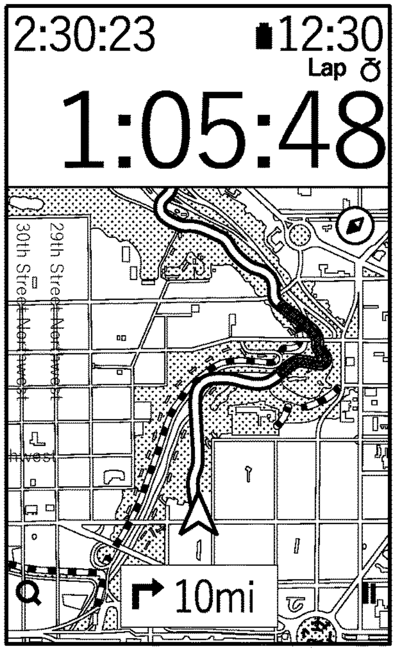
Figure 5B:
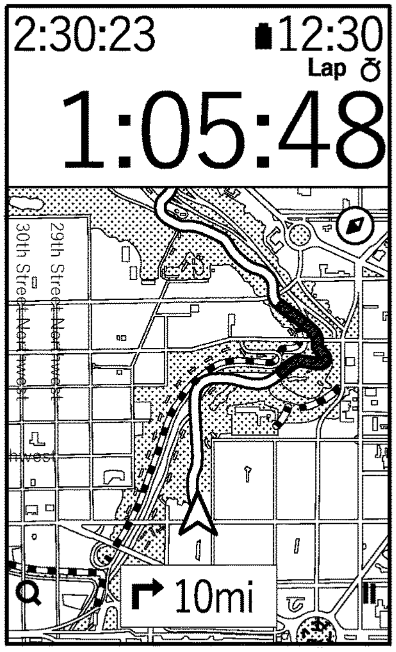
Figure 5C:
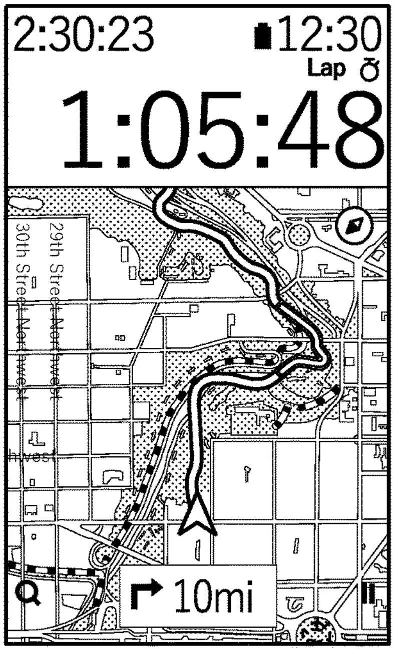
Figure 6:
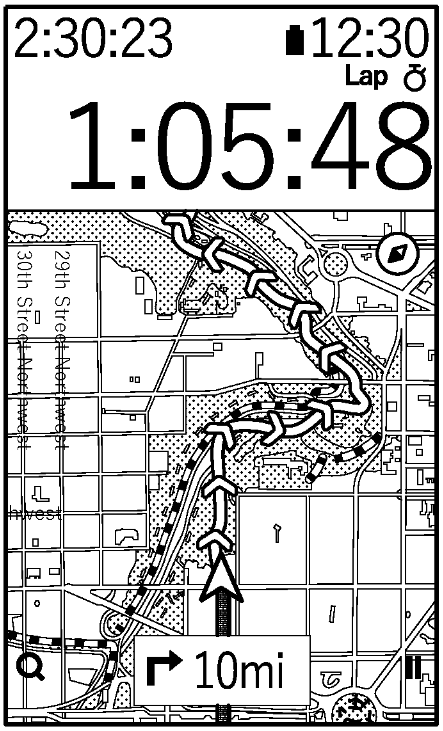

Accordingly, where the instance of the characteristic of interest (identified at 390) is an upcoming climb, the method may present the likely travel path (at 410) at the user interface 130 as a graph edge or sequence of consecutive graph edges highlighted on a map, as shown in FIGS. 4-6. The method may then present the upcoming climb (at 400) in that same display, either as an additional analytical panel or tray integrated into the user interface, or as a portion of the travel path. For example, an upcoming climb may be a portion of the likely travel path presented in a different color or with a different texture or dash or arrow pattern. Further, the climb itself may be color coded, or otherwise varied, in order to present a grade or degree of difficulty of the climb.

Figure 10:
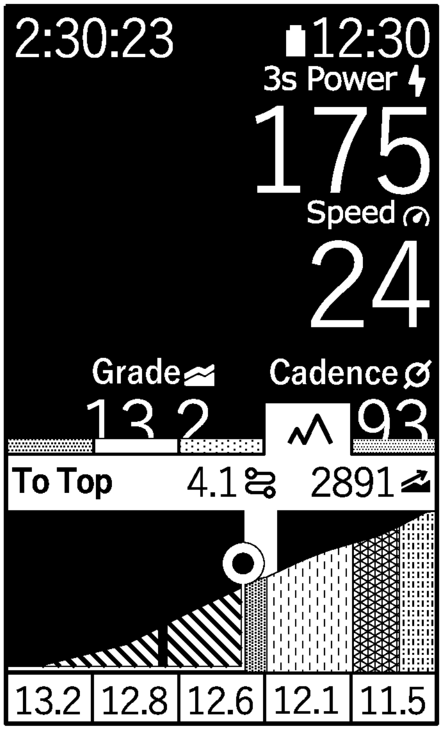
Figure 11:
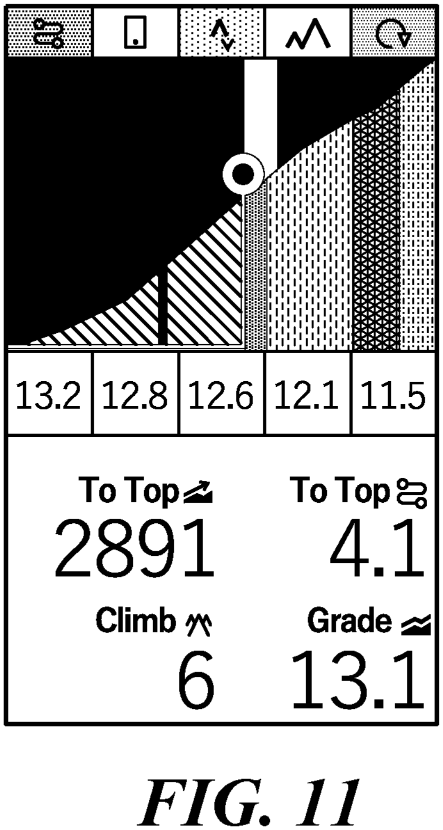

Alternatively, or in combination with such a presentation, the characteristic of interest may be presented (at 400) in numerical form or in a graphical form unrelated to a map. For example, as shown in FIGS. 10-11, a climb may be presented as a slope and the slope, or segments of the slope, may be color coded for grade or some other characteristic.

In many embodiments, the process described herein functions iteratively and repeatedly. Accordingly, once a likely travel path as been defined (at 370) and analyzed (at 380), a bicyclist using the method may have continued to travel. Accordingly, the method may then define (420) the determined current location as a third location of the navigation device 100 associated with a third time. This will typically occur while the method presents the likely travel path and upcoming climb (at 400, 410) to the user.

The method then proceeds through the iterative process by associating (at 330) the third location with coordinates on the first graph edge of the map and determining a travel direction (340) based on a sequence of the first, second, and third locations.

The method then again determines (350), by the position determining module 150, an updated current location of the navigation device 100.

The method then proceeds to identify (360) a second inferred path based on the coordinates associated with the first, second, and third locations (determined at 330, 420), the travel direction (determined at 340), and an updated current location (determined at 350). The second inferred path is further identified (at 360) based on characteristics of the map itself and graph edges adjacent to the first graph edge at which the device 100 has been located.

In some embodiments, the method updates the current location (determined at 350) and then determines whether the current location is on the already defined likely travel path. In such an embodiment, a second inferred path may be identified (360) only in cases where the current location is not on the likely travel path, indicating.

Because many embodiments of the method proceed iteratively, the second inferred path may be calculated repeatedly, and is therefore referenced herein as an updated inferred path. In many cases, the updated inferred path (identified at 360) is identical to the first inferred path. In such a scenario, where the updated inferred path is unchanged from a previous iteration, the likely travel path (370) remains unchanged and the analysis of mapping data (at 380) based on the likely travel path continues. Similarly, in embodiments where an updated inferred path is only identified (at 360) where the current location is not on the likely travel path, the analysis of mapping data (at 380) continues based on the likely travel path. Where the updated inferred path differs from a previous iteration, the method redefines (370) the likely travel path as the updated inferred path, thereby replacing the first inferred path in the definition.

The method then continues iteratively, repeatedly redefining the current location as an additional location at a new time in the travel direction and updating the inferred path (identified at 360) accordingly. Each time the method repeats this process, the method will determine whether the current location has strayed from the likely travel path and/or whether the updated inferred path differs from a previous definition of the likely travel path, and if so, the method may redefine the likely travel path (at 370), repeat the analysis (at 380) and update the presentation to the user (at 400) at the user interface 130.

As the method proceeds, the locations determined (at 330) may be weighted by various factors, including recency. As such, as the method proceeds iteratively, the weight of earlier determined locations may be reduced until such earlier determined locations are no longer considered part of the calculation.

It is noted that the first, second, and third locations determined are all assumed in this discussion to be on the first graph edge. However, as noted above, it is understood that as the process proceeds, the user, along with the device 100, will proceed along different graph edges as they transition from one travelable segment on the map to another travelable segment. Further, the position determining module 150 may determine locations at different intervals depending on the specific embodiment of the method. In some implementations, locations are updated once per second, resulting in a location refresh rate of 1 Hz. In some alternative implementations, the refresh rate may be different, or the refresh rate may depend on a velocity of the user, such that locations may be updated more frequently where the user is traveling faster.

Accordingly, in the context of embodiments determining locations at relatively short intervals, any two consecutive determined locations are likely to be on a single graph edge. However, when transitioning from one graph edge to an adjacent graph edge, the method will continue to generate and identify inferred paths (at 360) and redefining the likely travel path (at 370).

Similarly, the frequency of transitioning between graph edges can vary based on how quickly a user transporting the device 100 is moving, as well as by how granularly graph edges, or equivalent travelable segments, are defined in a specific map.

Figure 3:
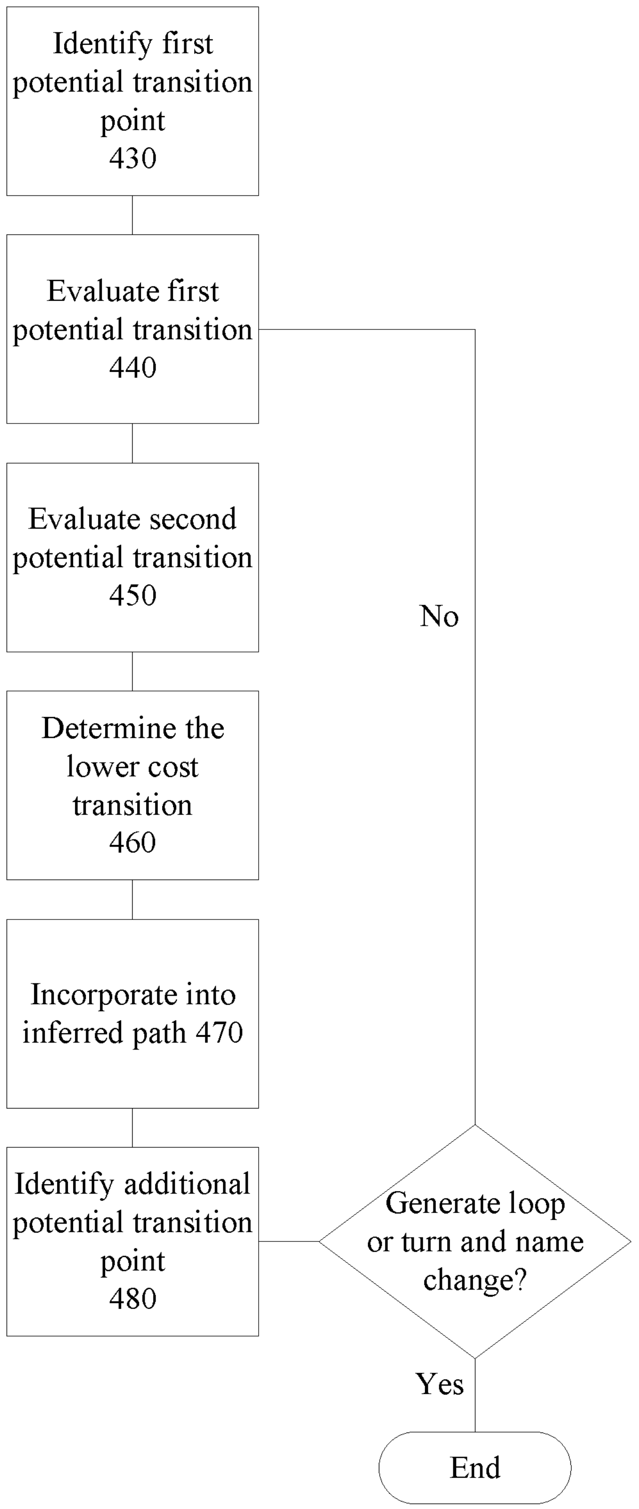
FIG. 3 illustrates a method for identifying an inferred path in the method of FIG. 2.

FIG. 3 illustrates a method for identifying an inferred path in the method of FIG. 2.

As noted above, the inferred path (identified at 360) may be based on characteristics of the map itself and graph edges adjacent to the first graph edge at which the device 100 has been located. Accordingly, the inferred path may be based on transition costing logic defining a cost of transitioning from the first graph edge to a second graph edge adjacent the first graph edge. Such transition costing logic may be applied with a high maneuver penalty. Accordingly, additional weighting may be applied to any transition away from the first graph edge or away from a continuation of a graph edge on which the device 100 is currently located. In other words, embodiments of the method assume that a user will continue straight, or will stay on a continuation of their current path, unless that path ends or otherwise changes. In some embodiments, the maneuver penalty may be at least partially based on road name consistency, and as such, transitions are penalized and disfavored if road names are not consistent.

When a navigation system is provided with a destination, and the system then calculates a route to the destination, routing is typically based on finding the shortest, quickest, easiest, or otherwise objectively preferred path to the destination. A user will then be presented with turn-by-turn directions in order to proceed along the calculated route. In contrast, the inferred path determined herein is more heavily weighted in favor of inertia and is based more directly on assumptions of how a user is likely to behave.

Accordingly, in some embodiments, any node or intersection between graph edges is considered. Any potential transition from a first graph edge to a potential second graph edge is assigned a cost, and that cost may be based on how likely a user is to transition to the potential second graph edge. In inferring the path, the transition costs are then minimized. In some embodiments, different parts of a single road may correspond to discrete graph edges. This may occur when a road branches off of a first graph edge, resulting in a node allowing for a transition to a second graph edge that branches or a third graph edge that is a continuation of the first graph edge, or it may occur when an attribute of the graph edge changes (such as a name change or a speed limit change, for example) but the road otherwise continues without interruption.

A selection of the second graph edge for inclusion in the inferred path may then be partially based on whether the second graph edge is a continuation of the first graph edge or whether the transition would require a turn. Similarly, the selection may be based on whether the second graph edge is a street or road with a street name the same as or related to a street name associated with the first graph edge.

Accordingly, embodiments of the method generally assume a user to be more likely to proceed straight on a street having the same name or a street with a similar name transitioning from, e.g., street to road, than they are to turn onto a street with a different name. As such, a name change, and a degree of a name change, would increase a cost associated with a transition from a first graph edge to a second graph edge.

Similarly, costs are applied to transitions away from a continuation of a graph edge or a straight path. Where consecutive graph edges are in a generally straight line, costs associated with transitioning would be relatively low. In contrast, a graph edge that requires a turn at a node is applied a relatively high cost. Accordingly, where a first graph edge arrives at a node, where a second graph edge continues straight and a third graph edge requires a turn, the second graph edge would typically be preferred.

However, if an obstruction or other disincentivizing factor exists in a graph edge that would otherwise be accessed at a relatively low transition cost, the transition cost may be increased. Accordingly, if a road is closed or blocked, a transition to such a road is unlikely, but not necessarily impossible, and therefore carries a relatively high cost. Similarly, if a road defining a straight path transitions to a different surface, such as gravel, or is unpaved, or changes names, transitioning to that graph edge or continuing on a current graph edge may be applied a high cost. The method may also consider whether another road is crossed to get to the next edge.

Costs may similarly be applied based on road type or classification. Accordingly, a high cost may be applied to transitioning to a highway or a boulevard, based on a change of speed limit associated with consecutive graph edges, or a cost may be applied based on the presence of a bicycle lane. Similarly, a transition to a bike path, or a street having a bike lane, may be applied a lower cost than many roads, on the assumption that a user having the device 100 is proceeding towards such a path or street. Further, costs may be based on turn angles or turn types or directions, truck routes, etc. Further, high costs may be assigned to transitions to certain types of road edges, such as roundabouts, ramps, or turn channels as well as graph edges that are "not-through" such as dead-ends. In some embodiments, graph edges having a high enough transition cost may be excluded entirely.

Such costs may be at least partially based on, or weighted based on, user preferences. For example, a user may have indicated that they prefer bike paths, thereby reducing costs associated with transitioning to bike paths. Similarly, the user may have indicated a preference for gravel, mountain biking, or smooth roads.

In some embodiments, roads themselves may have inherent road costs that are considered in determining costs of proceeding on a specified graph edge in addition to transition costs. Accordingly, in some embodiments, a high speed limit, such as in the case of a highway, may be considered a high cost road to be avoided and to be exited when possible.

In other embodiments, road costs may be deliberately ignored, or their impact reduced, so as to more heavily weight transition costs. Accordingly, evaluations may be based solely on transition costs at the end node of the current graph edge and at future nodes on the inferred path ahead. In this way, the method may consistently transition to upcoming graph edges following the lowest cost transition, in many cases ignoring any U-turns, ramps, roundabouts, and previously used edges (in order to prevent loops).

In many embodiments, the inferred paths (identified at 360) are identified iteratively. Accordingly, the method may identify (430) a first potential transition point, such as a node or intersection on the map, and evaluate (440) a first potential transition from the first graph edge and assign a cost. The method may then evaluate (450) a second potential transition from the first graph edge and assign a cost. The first transition may be a transition to a second potential graph edge while the second transition may be to a third potential graph edge. The method may then determine (460) the transition of the first and second transitions having the lower cost and incorporate the same into the inferred path (470) as a preferred transition. As a result, the inferred path would then include either the second potential graph edge or the third potential graph edge.

The method may then proceed along a graph edge resulting from the preferred transition and identify (480) a second potential transition point. The method would then again evaluate two potential transitions (440, 450) and incorporate (470) the transition having the lower cost into the inferred path as the next preferred transition. In this way, the method may infer a path to be defined as the likely travel path. Such a path may proceed for a predetermined distance or amount of time at a user's current pace, or number of transitions, or it may proceed indefinitely in this manner.

Such a procedure is similar to a depth-first search where a single branch is expanded at each step. The method described then uses transition costs to find the least cost edge at the intersection.

In some embodiments, the inferred path may be determined iteratively until the path loops back on itself, or names change from one road to the next and the turn direction is not straight ahead. In such embodiments, upon identifying an additional potential transition point (at 480), the method may first determine whether a potential inferred path generated by a transition would loop back on itself, or if a potential inferred path would lead to both a street name change and a turn. If either such scenario is identified, the method may then terminate.

During evaluation of identified potential transition points (at 430 and 480), the method may first map-match locations already determined (at 310, 320, and 350) to find the current edge. If no such edge is found, the method may fail and return an empty path. If such an edge is found, the method may proceed to find the next edge as an upcoming potential transition point (at 480).

The method may then determine if any potential transition (at 440, 450) is either named consistently with the current edge or represents a straight path from the current edge. If neither criterion is met, the method may return the previously calculated inferred path. If either criterion is met, the method may then determine if a maximum path length defined in the software has been exceeded. If so, the method may return the previously calculated inferred path. If not, the method may then determine if the edge identified is already in the path. If so, a loop has been identified and the previously calculated inferred path may be returned. If not, the method may incorporate the identified edge into the inferred path 470 and proceed to identify additional potential transition points (at 480).

In any scenario where the method fails and returns either no path or a previously calculated inferred path, the method may continue to repeat the process, such that once the a new path can be inferred, such an inferred path can be leveraged.

So long as a user continues on the likely travel path, the inferred path will typically be assumed to be accurate. However, if, as noted above, a determined current location indicates a transition away from the inferred or likely travel path, and as a result, a newly defined inferred path defines a likely travel path different than the existing likely travel path, the iterative process would typically restart.

It is noted that in some embodiments, a transition away from the likely travel path would not result in a different inferred path. For example, if only a single graph edge is available at a future location, or if transitions that keep a user away from a single graph edge are prohibitive, a transition away from a likely travel path would not necessarily result in a redefined likely travel path. For example, if only a few local roads cross over a single preferred graph edge, the method may assume that the user will return to the single preferred graph edge. This may occur when a major bike path pass through a small town or when a user transitions to a dead-end street. Accordingly, where a user, for example, stops for a snack or for lunch, or stops at a lookout point, the method may expect the user to return to the likely travel path.

The characteristic of interest identified (at 390) can be any number of characteristics. As noted above, the method is presented in the context of a cycling computer and the characteristic of interest may be a climb along a likely travel path. Accordingly the characteristic of interest may be defined in terms of elevation data associated with the likely travel path. The elevation data may include elevation at various locations, as well as inclination data at various locations.

As such, in identifying the characteristic (at 390), the method may first identify, in the elevation data, at least one selected ascent along the likely travel path for presentation to the user. This may be an ascent that satisfies certain predefined metrics. For example, the ascent may be selected if it has an average grade greater than a threshold grade for a threshold distance. For example, a climb may be defined as an any ascent having an average grade of at least 3% for at least 500 meters.

In some embodiments, multiple categories of grades may be defined. Accordingly, a climb may be defined as any ascent having an average grade of at least 3% for at least 500 meters. However, a medium climb may be defined as an ascent having an average grade of at least 7% and a large climb may be defined as an ascent having an average grade of at least 15% for 500 meters. Such a medium climb and large climb may have alternative definitions based on length of climbs as well. Accordingly, a medium climb may have a grade of at least 3% if it continues for at least one kilometer, and a large climb may have a grade of at least 3% if it continues for at least 2.5 km. Such categories of climbs may be defined along a sliding scale such that, for example, a climb of 10% for 2 km may be classified based on a combination of both a grade and length being greater than the individual thresholds for a medium climb. Alternatively, an identification of an ascent as a climb as well as the categorization of such a climb may be based on an overall elevation of the climb with a distance-based cutoff. As such, any change in elevation over 30 meters over 1 km may be defined as a climb.

In any event, an ascent defined as a climb may then be identified (at 390) for presentation to the user. The method then determines at least one metric associated with the at least one ascent and presents the at least one identified ascent to the user (at 410) along with the at least one metric. For example, the metric may be a length of the climb, a grade of the climb, or an overall elevation of the climb. One or more of these metrics may be presented to the user.

In some embodiments, the metrics to be presented to the user are user selectable, and the determination of which climbs to present to the user may be user selectable as well. Further, in some embodiments, the metrics to be presented to the user are the same as or a subset of or otherwise related to the metrics used to define an ascent as a climb to be presented. In some embodiments, a threshold may be used to determine which climbs to be presented to the user, and an ascent may be presented to the user as a climb only if the at least one metric associated with the ascent is greater than a threshold associated with the corresponding metric.

In some embodiments, the method may proceed to identify a plurality of ascents (at 390) as climbs, and may present information about all identified climbs to the user. In some embodiments, such a presentation of the information may include cumulative metrics, such as a number of climbs or an overall elevation to be climbed along the likely travel path, and such a presentation may include a metric derived from some combination of the cumulative metrics and metrics related to individual climbs. For example, the method may present an average climb difficulty or grade over an upcoming sequence of climbs, or the method may present a difficulty rating for the likely travel path.

In some embodiments, after identifying a likely travel path, the method may proceed to identify at least one secondary potential travel path. This secondary potential travel path may be based on the same data used to identify the likely travel path, and therefore may be based on the coordinates associated with the first and second locations and any additional locations defined, the travel direction, and the current location.

The method may then analyze mapping data associated with the at least one secondary potential travel path to identify at least one instance of the characteristic of interest. In the embodiment discussed here, the method would therefore identify at least one climb in the mapping data associated with the at least one secondary potential travel path. The at least one secondary potential travel path may then be presented to the user along with the at least one instance associated with the secondary travel path.

The secondary potential travel path may then be presented alongside the likely travel path, allowing the user to compare the two paths. Should the user choose to pursue the secondary potential travel path, the method would then detect on future iterations that the current location (determined at 350) would no longer correspond to that expected for the inferred path, resulting in an identification of a new inferred path (at 360).

In some embodiments, the method may consider the characteristic of interest in determining which travel path is most likely. For example, a user may generally proceed on paths that avoid hills, and as such, the presence of climbs may make a particular travel path more or less likely.

In such an embodiment, the method may initially identify the likely travel path and the at least one secondary potential travel path as two potential travel paths prior to analyzing mapping data associated with each of the paths. The method may then analyze mapping data associated with each of the potential paths to identify at least one instance associated with each potential travel path. The method may then proceed to rank each of the travel paths based on a metric associated with the characteristic of interest. If the at least one secondary potential travel path is then ranked as preferable to the likely travel path, the method may proceed by redefining the at least one secondary potential travel path as the likely travel path and may then redefine the first inferred path as the secondary potential travel path based on the metric.

In some embodiments where multiple potential travel paths are identified, the likely travel path and the at least secondary potential travel path may be presented to the user on a single map. An indication of each travel path may then be visually presented to the user. In such an embodiment, each travel path may then have a characteristic associated with the characteristic of interest. For example, the travel path may have a color associated with the characteristic of interest.

In some embodiments, the method may further comprise retrieving data associated with prior trips performed by the user from a database. Such data, comprising a user's history, may be used in inferring the path the user is likely to take. Accordingly, the prior travel data may comprise routes previously traveled and the identification of the first inferred path (at 360) may be further based on the prior travel data. The prior travel data may comprise a personal heatmap representing routes previously traveled by the user. Similarly, the prior travel data may comprise generalized heatmaps representing routes previously traveled by a group of users including the user. Accordingly, popularity or prior usage history of various paths may be used to further infer a probable path.

In some embodiments, the method further comprises retrieving user preference information. The user preference information may then be used in inferring the path the user is likely to take. For example, in some embodiments, the user may specify a preferred surface for riding or a preferred type of graph edge. This may be, for example, a preference for gravel, mountain biking, or road biking. Similarly, a preference may be expressed or inferred for the "safest" path ahead, thereby avoiding crossing major roads or choosing edges that have bicycle amenities, such as cycling lanes.

FIGS. 4-14 illustrate example display configurations of a device implementing the method of FIG. 2.

As shown in FIG. 4, in some embodiments, the method may present a graphical representation of the likely travel path to the user, in this case, the likely travel path is shown with a first characteristic, which may be a pattern or texture. In this case, it is shown in gray, but it may similarly be shown in a color, such as purple. This may be integrated into a standard map display used by the device 100. A segment of the likely travel path corresponding to the characteristic of interest may then be presented with a different characteristic, such as in a different color, in this case, white, such that the characteristic of interest is at least partially integrated into the representation of the likely travel path, but is clearly distinguished based on the characteristic. Accordingly, the method may display the inferred travel path being used as the likely travel path while presenting a location of, for example, a climb in that path.

As shown in FIGS. 5A-C, the color or characteristic of the segment of the likely travel path corresponding to the characteristic of interest may be varied in different ways. In the embodiment shown, the variation of the segment corresponding to the characteristic of interest may be varied in order to present a variable of the characteristic of interest. For example, where the segment highlighted represents a climb, the color or texture may represent a grade. As such, a blue color, or a first shade of gray or texture presented may be a relatively shallow grade, while a color transition to red or a darker color or higher contrast texture may represent a steeper grade.

As shown in FIG. 6, an additional visual element may be overlaid on the likely travel path. Accordingly, the likely travel path may be presented in a color or texture, such as in blue, and a sequence of chevrons may be applied to the travel path for the length of a climb. In such an embodiment, a color or other characteristic of the chevrons may correspond to a slope of the climb.

Accordingly, the map may present a substantial amount of information about the characteristic of interest, namely the climb, to the user in a coherent way. The user is then presented with the likely travel path as assumed by the system, a distance to the beginning of the climb, a length of the climb, and a grade of the climb.

Figure 7:
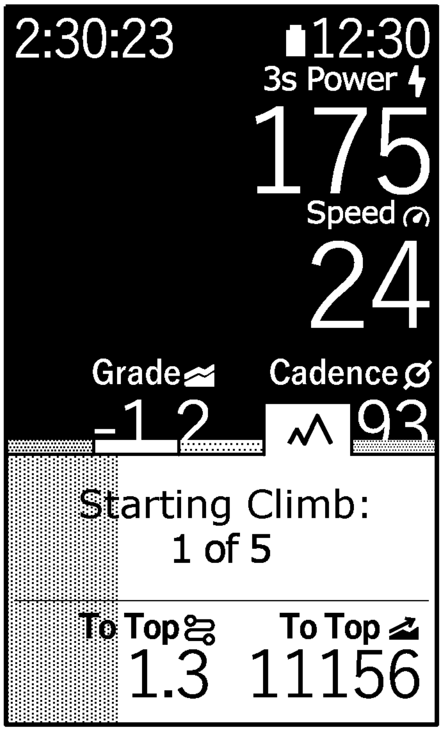

In many embodiments, the characteristic of interest is presented to the user in the context of a simplified display. Often, when a user is not using the device 100 for navigation, they may utilize a display that provides basic information about their ride, such as current speed, in a simplified manner. As such, as shown in FIG. 7, the characteristic of interest may be made available to the user in a drawer that overlays the basic cycling computer display.

Figure 8:
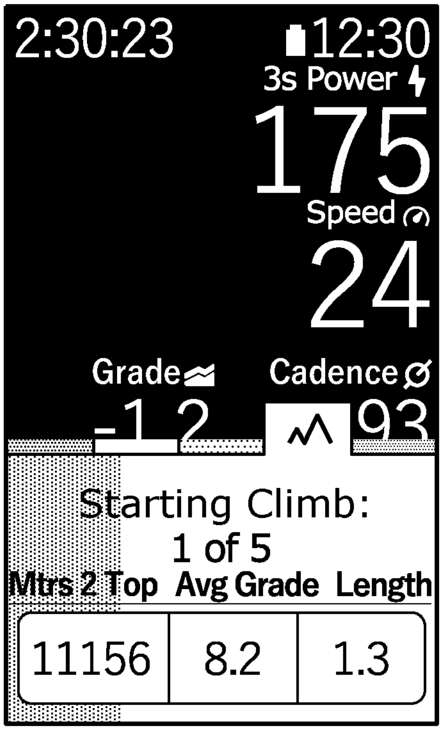

The user may choose to view the presented metrics about the characteristic of interest in a minimal display, as shown. Such a minimal display may provide different amounts of information. As shown in FIG. 7, the minimal display may present a length of the climb along with a distance to the top. As shown in FIG. 8, the minimal display may further present an average grade of the climb. In any event, the method may track multiple iterations of the characteristic of interest, in this case 5 climbs, and indicate a user's current position in that sequence.

Figure 9:
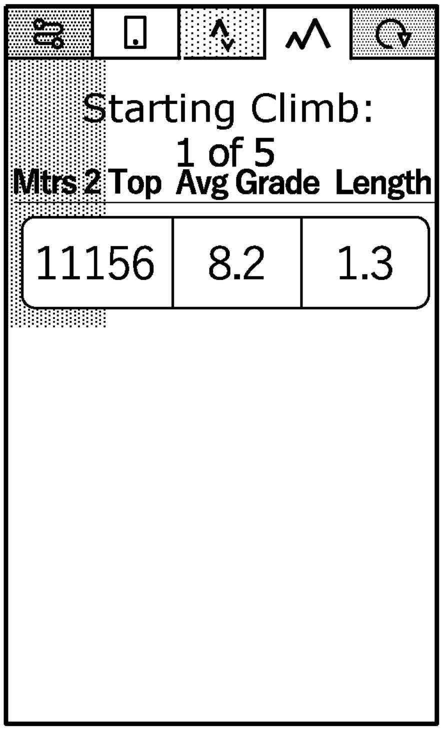

As shown in FIG. 9, a user may expand the drawer presenting data and may thereby be presented with a full screen display providing similar data.

As shown in FIG. 10, metrics associated with the characteristic of interest may be presented in different ways. Accordingly, in a minimal version of the drawer, a graphical display of a current climb may be presented. Such a display may use colors or textures to illustrate a slope at different parts of the climb. A full screen display, such as that shown in FIG. 11, may again be accessed by expanding the drawer presented to the user. The full screen display may then combine the graphical display of the current climb with additional metrics, such as grade and distance to the top.

Figure 12:
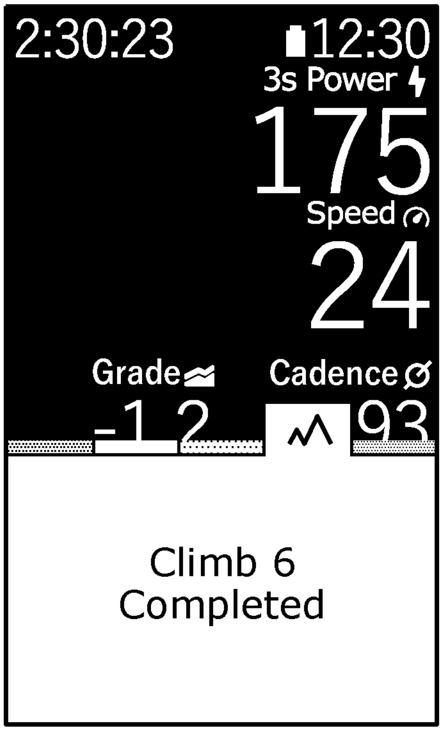
Figure 13:
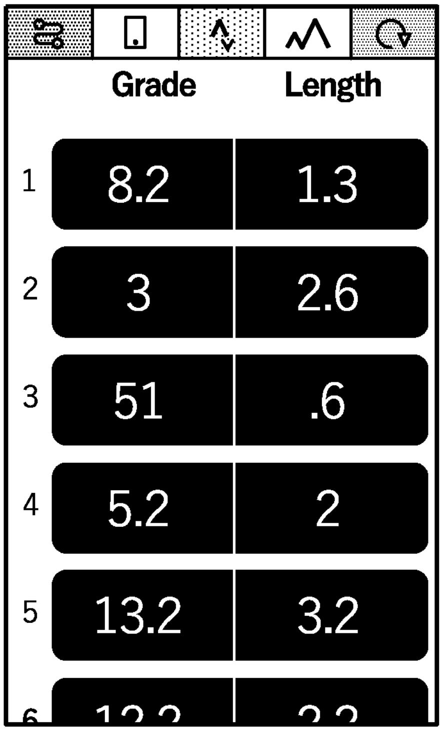

As shown in FIG. 12, the method may track past iterations of the characteristic of interest. Accordingly, after a user has completed several climbs, a minimal version of the drawer may simply indicate to the user how many climbs have been completed. An expanded version of the same drawer, as shown in FIG. 13, may then show a user metrics of previously completed climbs.

Figure 14:
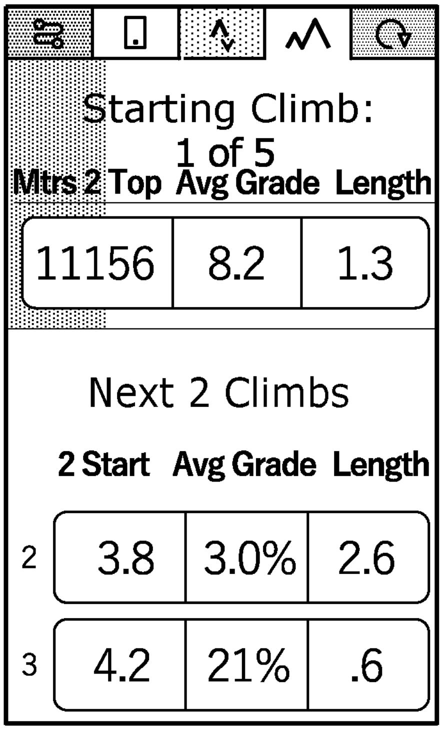

As shown in FIG. 14, an expanded version of a drawer used in this method may provide metrics about upcoming climbs along the likely travel path.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A computer-based method for providing analytical features at a navigation device comprising:

displaying a navigation or cycling computer interface at the navigation device;

determining, by a position determining module of the navigation device, a first location of the navigation device associated with a first time during a trip;

determining, by the position determining module, a second location of the navigation device associated with a second time during the trip;

associating the first and second locations with coordinates on a first graph edge of a map;

determining a travel direction based on a sequence of the first and second locations;

determining, by the position determining module, a current location of the navigation device during the trip;

identifying a first inferred path based on the coordinates associated with the first and second locations, the travel direction, and the current location, the first inferred path defining a likely travel path, and the first inferred path not being based on data associated with prior trips performed by a user of the navigation device;

analyzing mapping data associated with the likely travel path to identify at least one instance of a characteristic of interest, the characteristic of interest corresponding to a change in elevation along the likely travel path; and modifying the navigation or cycling computer interface to incorporate the identified instance of the characteristic of interest, wherein the identified instance of the characteristic of interest is presented as any one of or a combination of an overlay and an aesthetic characteristic integrated into a representation of the likely travel path in the context of the map, and wherein the identified instance of the characteristic of interest was not previously presented on the navigation or cycling computer interface; and displaying a modified presentation of the navigation or cycling computer interface at the navigation device.

2. The computer-based method of claim 1 further comprising:

defining the determined current location as a third location of the navigation device associated with a third time;

associating the third location with coordinates on the first graph edge of the map;

determining a travel direction based on a sequence of the first, second, and third locations;

determining, by the position determining module, an updated current location of the navigation device, identifying a second inferred path based on the first, second, and third locations, the travel direction, and the updated current location, and redefining the likely travel path if the second inferred path defines a likely travel path different than the first inferred path.

3. The computer-based method of claim 2 wherein the second inferred path is identified only upon determining that the updated current location of the navigation device is not on the likely travel path.

4. The computer-based method of claim 1, wherein the first inferred path is further based on transition costing logic defining costs of transitioning from the first graph edge to a second graph edge with a high maneuver penalty.

5. The computer-based method of claim 4, wherein the first inferred path is assumed to proceed substantially straight on consecutive graph edges unless an obstruction increases a cost associated with proceeding substantially straight.

6. The computer-based method of claim 5 wherein each transition between graph edges is assigned a cost, and wherein a cost of the transition to the second graph edge is partially based on a road classification of the second graph edge.

7. The computer-based method of claim 4, wherein the first inferred path is identified iteratively such that a first portion of the likely travel path is first defined and a continuation of the first inferred path is further based on the inclusion of locations along a graph edge included along the likely travel path.

8. The computer-based method of claim 7, wherein the iterative method includes locations along the graph edge in the first inferred path only upon confirming that the inferred path has not looped back on itself, and upon confirming that either a street name for a location to be included is related to a street name of a previous graph edge or the location to be included does not require a turn.

9. The computer-based method of claim 4, wherein any potential transition from the first graph edge to a potential second graph edge is assigned a cost and wherein a selection of the second graph edge for inclusion in the inferred path is based partially on whether the second graph edge has a street name related to a street name of the first graph edge.

10. The computer-based method of claim 1, wherein the first inferred path is not based on a defined or predicted destination.

11. The computer-based method of claim 1 further comprising:

identifying, in the elevation data, at least one ascent along the likely travel path for presentation to the user; and determining at least one metric associated with the at least one ascent, wherein modifying the navigation or cycling computer interface comprises presenting the at least one identified ascent to the user with the at least one metric.

12. The computer-based method of claim 11, wherein the at least one metric is one of length of climb, grade of climb, and elevation of climb.

13. The computer-based method of claim 11, wherein the at least one ascent is presented to the user only if the at least one metric associated with the at least one ascent is greater than a threshold associated with the corresponding metric.

14. The computer-based method of claim 1, wherein the method further comprises identifying, based on the coordinates associated with the first and second locations, the travel direction, and the current location, at least one secondary potential travel path, analyzing mapping data associated with the at least one secondary potential travel path to identify at least one instance of the characteristic of interest associated with the at least one secondary potential travel path, and further modifying the navigation or cycling computer interface to present the at least one secondary potential travel path and the at least one instance associated with the at least one secondary potential travel path to the user with the at least one instance associated with the likely travel path.

15. The computer-based method of claim 14, wherein the method initially identifies the likely travel path and the at least one secondary potential travel path prior to analyzing mapping data associated with each of the likely travel path and the secondary potential travel path, analyzes mapping data associated with each of the likely travel path and the at least one secondary potential travel path to identify at least one instance associated with each travel path, and ranks the likely travel path and the at least one secondary potential travel path based on a metric associated with the characteristic of interest, and wherein the at least one secondary potential travel path is redefined as the likely travel path and the first inferred path is redefined as a secondary potential travel path based on the metric.

16. The computer-based method of claim 14, wherein, upon modifying the navigation or cycling computer interface, the likely travel path and the at least one secondary potential travel path are presented to the user on a single map, and wherein an indication of each travel path has a characteristic associated with the characteristic of interest.

17. The computer-based method of claim 1, wherein the method further comprises retrieving user preference information, and wherein the identification of the first inferred path is further based on the user preference information.

18. The computer-based method of claim 1 wherein the navigation or cycling computer interface displays current speed and wherein the modifying of the navigation or cycling computer interface comprises presenting the identified instance of the characteristic of interest in the overlay, the overlay including information about the change in elevation without illustrating the likely travel path.

19. A computer-based method for providing analytical features at a navigation device comprising:

displaying a navigation or cycling computer interface at the navigation device;

determining, by a position determining module of the navigation device, a first location of the navigation device associated with a first time during a trip;

determining, by the position determining module, a second location of the navigation device associated with a second time during the trip;

associating the first and second locations with coordinates on a first graph edge of a map;

determining a travel direction based on a sequence of the first and second locations;

determining, by the position determining module, a current location of the navigation device during the trip;

identifying a first inferred path defining a likely travel path based on the coordinates associated with the first and second locations, the travel direction, the current location, and transition costing logic defining costs of transitioning from the first graph edge to a second graph edge, wherein each transition between graph edges is assigned a cost, and wherein the first inferred path excludes a highest cost transition between path edges;

analyzing mapping data associated with the likely travel path to identify at least one instance of a characteristic of interest, the characteristic of interest including a change in elevation along the likely travel path;

modifying the navigation or cycling computer interface to incorporate the identified instance of the characteristic of interest, wherein the identified instance of the characteristic of interest is presented as an overlay that was not previously presented on the navigation or cycling computer interface; and displaying a modified presentation of the navigation or cycling computer interface at the navigation device.

20. A computer-based method for providing analytical features at a navigation device comprising:

displaying a navigation or cycling computer interface at the navigation device;

determining, by a position determining module of the navigation device, a first location of the navigation device associated with a first time during a trip;

determining, by the position determining module, a second location of the navigation device associated with a second time during the trip;

associating the first and second locations with coordinates on a first graph edge of a map;

determining a travel direction based on a sequence of the first and second locations;

determining, by the position determining module, a current location of the navigation device during the trip;

identifying a first inferred path defining a likely travel path based on the coordinates associated with the first and second locations, the travel direction, the current location, and transition costing logic defining costs of transitioning from the first graph edge to a second graph edge, wherein each transition between graph edges is assigned a cost, and wherein the first inferred path is selected based on the cost between path edges;

analyzing mapping data associated with the likely travel path to identify at least one instance of a characteristic of interest, the characteristic of interest including a change in elevation along the likely travel path;

modifying the navigation or cycling computer interface to incorporate the identified instance of the characteristic of interest, wherein the identified instance of the characteristic of interest is integrated into the representation of the likely travel path as an aesthetic characteristic in the context of the map, and wherein the characteristic of interest was not previously presented on the navigation or cycling computer interface and the representation of the likely travel path is distinguishable from the current path; and displaying a modified presentation of the navigation or cycling computer interface at the navigation device.

* * * * *